(12) United States Patent
Kokemohr

(10) Patent No.: US 9,053,530 B2
(45) Date of Patent: Jun. 9, 2015

(54) METHOD FOR SLICED INPAINTING

(75) Inventor: Nils Kokemohr, Hamburg (DE)

(73) Assignee: Google Inc., Mountain View, CA (US)

( * ) Notice: Subject to any disclaimer, the term of this patent is extended or adjusted under 35 U.S.C. 154(b) by 1421 days.

(21) Appl. No.: 11/946,005

(22) Filed: Nov. 27, 2007

(65) Prior Publication Data

US 2008/0170807 A1 Jul. 17, 2008

Related U.S. Application Data

(60) Provisional application No. 60/867,373, filed on Nov. 27, 2006.

(51) Int. Cl.
 *G06K 9/00* (2006.01)
 *G06T 5/00* (2006.01)

(52) U.S. Cl.
 CPC ............... *G06T 5/001* (2013.01); *G06T 5/005* (2013.01)

(58) Field of Classification Search
 CPC ......... G06T 5/005; G06T 5/001; G06T 5/006; A01B 12/006
 USPC ......... 382/181, 190–195, 198, 199, 205, 209, 382/254, 255, 260, 263, 266, 274, 275, 283, 382/293, 295–298
 See application file for complete search history.

(56) References Cited

U.S. PATENT DOCUMENTS

| | | | | |
|---|---|---|---|---|
| 4,490,744 A | * | 12/1984 | Levine | 348/249 |
| 5,157,424 A | * | 10/1992 | Craven et al. | 346/107.2 |
| 5,544,239 A | * | 8/1996 | Golin et al. | 382/236 |
| 5,638,496 A | | 6/1997 | Sato | |
| 5,661,521 A | * | 8/1997 | Curtis et al. | 348/249 |
| 6,313,883 B1 | * | 11/2001 | Thaler | 348/630 |
| 6,535,301 B1 | | 3/2003 | Kuwata et al. | |
| 6,807,288 B2 | * | 10/2004 | Inagaki | 382/106 |
| 6,829,393 B2 | * | 12/2004 | Jansson | 382/275 |
| 7,545,408 B2 | * | 6/2009 | Nomura et al. | 348/208.1 |
| 2003/0099406 A1 | | 5/2003 | Chien | |

(Continued)

FOREIGN PATENT DOCUMENTS

EP 0 886 437 A2 12/1998
JP 7-162677 A 6/1995

(Continued)

OTHER PUBLICATIONS

The International Search Report of the International Searching Authority dated May 28, 2008.

(Continued)

*Primary Examiner* — Brian Le
(74) *Attorney, Agent, or Firm* — IP Spring

(57) ABSTRACT

A method for replacing image data in a destination region that is divided into sub-pieces along one or more cutting paths, which start and end at two different points on the border, and finding replacement data for the sub-pieces. The cutting paths may be determined as a function of the type of image structured at the start and the end points. The cutting paths may also be determined as a function of the area of the sub-pieces and the lengths of the cutting paths. Optionally, the destination region may be determined by a spot detection algorithm. Further optionally, the spot detection algorithm may comprise calculation of a high pass filter, or detection of areas of luminosity and border-to-volume ratios. A method for moving an image element within an image is also provided.

8 Claims, 3 Drawing Sheets

300

400

(56) References Cited

U.S. PATENT DOCUMENTS

| | | |
|---|---|---|
| 2003/0210828 A1 | 11/2003 | Chien |
| 2004/0031036 A1* | 2/2004 | Dinges et al. ............... 719/310 |
| 2007/0071347 A1* | 3/2007 | Li et al. ...................... 382/254 |
| 2008/0187198 A1* | 8/2008 | Grady et al. ................ 382/128 |
| 2009/0016609 A1* | 1/2009 | Zakrzewski et al. ........ 382/190 |
| 2009/0226092 A1* | 9/2009 | Kuroda et al. .............. 382/190 |

FOREIGN PATENT DOCUMENTS

| | | |
|---|---|---|
| JP | 10-091761 A | 4/1998 |
| JP | 11-146219 A | 5/1999 |
| JP | 2000-151985 A | 5/2000 |
| JP | 2001-67469 A | 3/2001 |

OTHER PUBLICATIONS

The Written Opinion of the International Searching Authority dated May 28, 2008.

Chiyo Date et al., Sentakuhanni-hen, Mac Fan Special 14, Feb. 22, 2001, pp. 51-70, Mainichi Communications, Japan.

International Preliminary Report on Patentability dated Jun. 3, 2009 for related PCT Application No. PCT/US2007/085672.

Written Opinion of the International Search Authority dated May 27, 2009 for related PCT Application No. PCT/2007/085672.

* cited by examiner

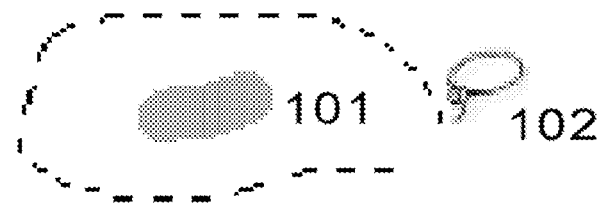
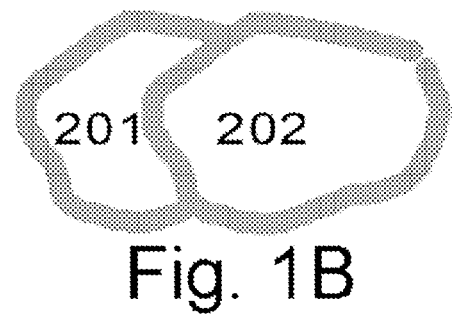
Fig. 1A
Fig. 1B
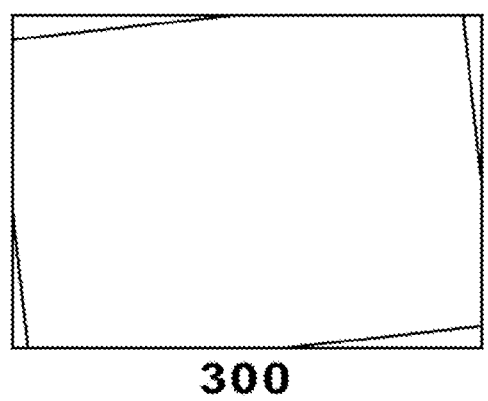
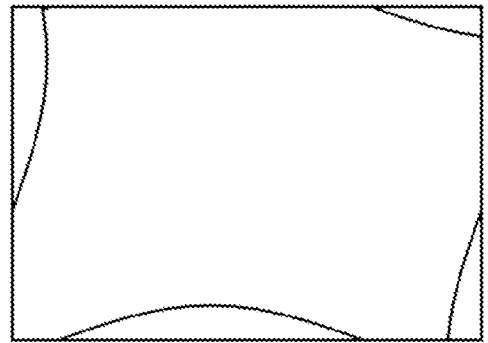
Fig. 1C
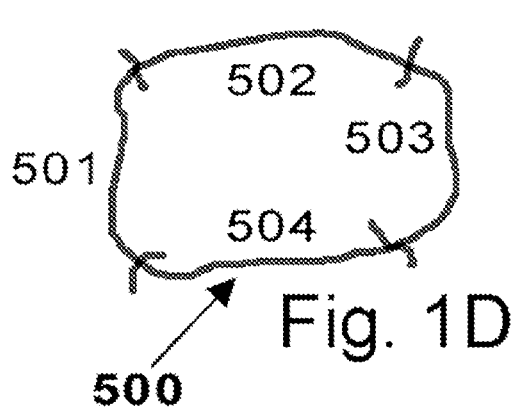
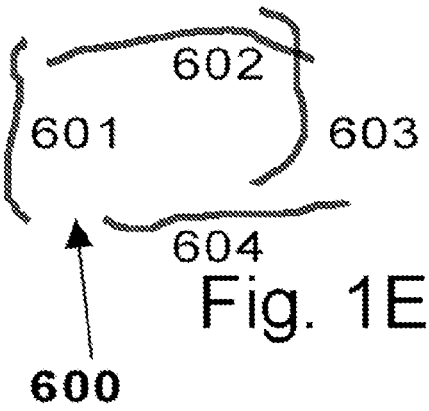
Fig. 1D
Fig. 1E

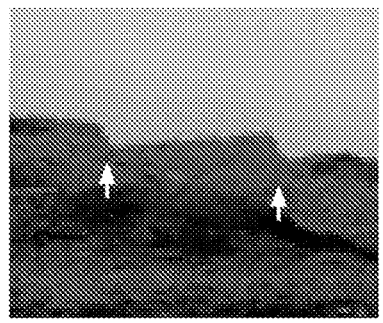
Fig. 2A
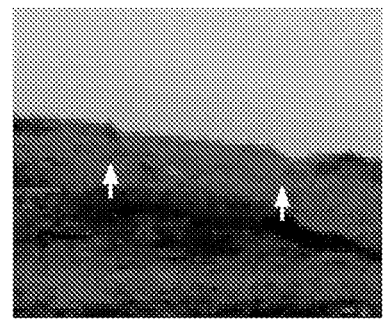
Fig. 2B
Fig. 2
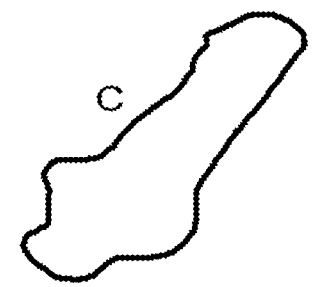
Fig. 5A
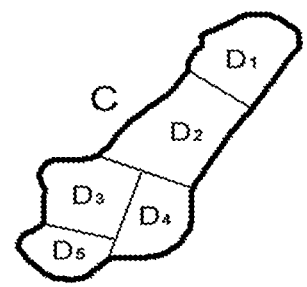
Fig. 5B
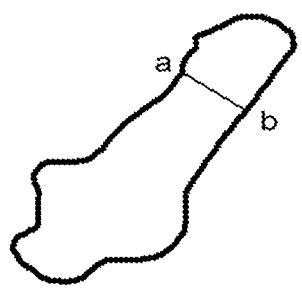
Fig. 5C
Fig. 5

Fig. 3A
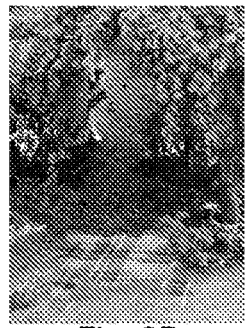
Fig. 3B
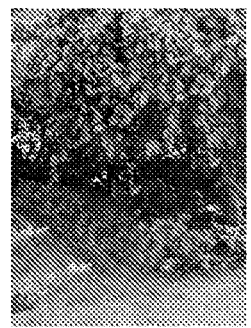
Fig. 3C
Fig. 3
Fig. 4A
Fig. 4
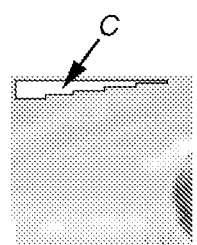
Fig. 4B
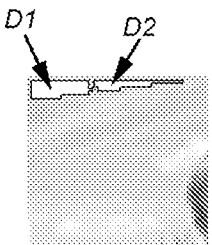
Fig. 4C
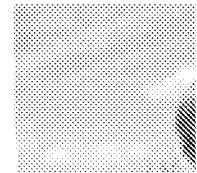
Fig. 4D

METHOD FOR SLICED INPAINTING

CROSS REFERENCE TO RELATED APPLICATION

The present Application claims the benefit of U.S. Provisional Patent Application No. 60/867,373 titled "Method for Sliced Inpainting" filed Nov. 27, 2006, the content of which is incorporated by reference in this disclosure in its entirety.

BACKGROUND

Inpainting repairs defective, unwanted or missing image areas by replacing them with a suitable, adapted piece found elsewhere in the image, preferably without visible artifacts.

Many papers and patents have been published on inpainting. Inpainting typically covers the problem of replacing annoying, unwanted or missing image data with new pixels. Some suggestions have been made to repair the image area with repeated use of convolution kernels, while some suggest or implement the use of replacement pixels or replacement structure.

Routines work well only when the user provides a suggestion to the algorithm as to which image area might make a good candidate for replacing the area to be inpainted. Routines that try to find replacement data automatically do not work well once the replacement area is large (larger than 1% of the image). What is needed is a system that does a better job in finding replacement areas, and that can assemble replacement image data comprised of multiple smaller areas if the area to be inpainted is very large.

SUMMARY

The invention meets this need by providing a method for replacing image data in a destination region having a border, comprising dividing the destination region into sub-pieces along one or more cutting paths, the cutting paths starting and ending at two different points on the border of the destination region; and finding replacement data for the sub-pieces.

The cutting paths may be determined as a function of the type of image structured at the start and the end point of the cutting path. In another embodiment, the cutting paths are determined as a function of the area of the sub-pieces and the lengths of the cutting paths.

The destination region may be the product of a rotation, a perspective correction, a lens distortion correction, or a creative image distortion. Optionally, the destination region may be determined by a spot detection algorithm. Optionally, the spot detection algorithm may comprise calculation of a high pass filter, or detection of areas of luminosity and border-to-volume ratios.

Also provided is a method for moving an image element within an image, comprising receiving the boundary of a source region comprising the image element; receiving a destination region within the image; copying image data from the source region to the destination region; determining a residual region, comprising area of the source region that does not intersect with the destination region; and applying an inpainting routine to the residual region.

Optionally, before the applying step, the residual region may be divided into sub-pieces. The copying step may comprise an adaption method based upon differences between pixel values of the margin of the source region and the margin of the destination region.

BRIEF DESCRIPTIONS OF THE DRAWINGS

FIG. 1 shows various aspects of the invention disclosed.
FIG. 1A depicts how a user can provide a region of interest to the system/application to indicate an image imperfection that needs to be removed. FIG. 1B depicts in simplified form a selected part of the image that was moved by the user. FIG. 1C show rotated or distorted images which no longer fill out the full rectangular shape of the image. FIG. 1D shows how a margin can be split up into four sections. FIG. 1E shows the sections of FIG. 1D with a slight offset per section.

FIG. 2A depicts a sub-optimal copying of a replacement structure into a destination area, and FIG. 2B depicts an enhanced copying using a slight distortion.

FIG. 3 demonstrates how a large object may be removed using an embodiment of the slicing aspect of the invention. FIG. 3A shows a large object that needs to be removed. FIG. 3B shows an object reduction using one whole, un-sliced replacement piece of a different area in the image, and FIG. 3C shows how good results can be obtained if the replacement structure is assembled of multiple smaller regions.

FIG. 4 depicts an image and inpainting of the upper left corner of that image according to one embodiment of the invention.

FIG. 5 shows a process for slicing regions to be inpainted according to an embodiment of the invention. FIG. 5A shows a potential region of interest C, FIG. 5B shows a potential "slicing" of the region C into sub-regions $D_1 \ldots D_5$, and FIG. 5C shows a cutting vector.

DETAILED DESCRIPTION

We inpaint an image area by the following routine:

Algorithm 01

1—receive pixels of area to be inpainted (area D)
2—find an area that has suitable structure (area S) to replace area D
3—copy pixels of area S into area D
4—adapt the new pixels in area D so that they fit seamlessly While the routine for step 3 is trivial, 1, 2 and 4 are not. Therefore the routines in step 1, 2 and 4 are described below in detail; Step 1: "Finding Area D"; Step 2: "Finding Area S"; and Step 4: "Adaption".

Step 1: Finding Area D

Finding Area D (the area to be inpainted) is not discussed much in the literature since it is generally assumed that the user circles or otherwise identifies the unwanted area. In this disclosure we suggest some other methods to obtain an area D.

Note that when the plural "we" is used in this disclosure it is not meant to imply that there are multiple inventors. It is solely used as a grammatical device for explication.

Finding Area D—Method 1: User Defined

This approach is trivial: allow the user to brush, paint, circle or otherwise determine an image area. One of ordinary skill with reference to this disclosure will know how to allow a user to point out a region of interest. FIG. 1A shows how a user can circle an unwanted area 101 in a digital image with a pointing device 102. The pixels within the area are then considered pixels within area D.

Finding Area D—Method 2: Automatic Dust and Blemish Detection

This method is suitable to identify dust, skin blemishes and other similar details that the user typically wants to remove. It can be done by the following spot-detection-algorithm:

Algorithm 02

1—create a highpass of the image I and store it in H
2—Create H' so that H'=0 if H<n and H'=else.

3—Find an area which isn't yet inpainted of 20 to 600 connected 1's in H' that has a low border-pixel-to-total-pixel-count. END if no such area can be found.

4—apply Algorithm 01 to the found area, the found area being D.

5—go to step 3.

We suggest that the highpass used in step 1 utilize a radius of about 0.05% to 1.5% of the image diameter and produces a result the mean of which is 128.

The variable n in step 2 can be any number lower than 128, for instance 125. The lower the number, the stronger and contrastier the blemishes need to be to be detected. Note that the algorithm assumes that unwanted objects are darker that the surrounding image, which is typically the case.

In step 3, the range 20 to 600 can of course be adapted to the image size and to the imperfections to be removed. For instance, it may be adjusted to the type of dust that may occur on the sensor. For instance, some SLR cameras may have larger dust than other cameras based on the physics of the camera. Sufficient literature has been written on how to detect whether an area of connected 1's is prolonged, compact or circular, particularly based upon calculations on border-pixel-to-total-pixel ratio respectively outline to volume ratio. The optimal theoretical border-pixel-to-total-pixel ratio of an image is $4a/a^2$, which will due to noise not be reached, so $10a/a^2$ is a good value to start with for a low border-pixel-to-total-pixel-count.

Finding Area D—Method 3: Undefined Areas Due to Moved Selections

This is a rather helpful technique for users dealing with image retouching. FIG. 1B depicts a selected bitmap area 202 containing an image element that the user has moved to the right, leaving pixels in bitmap area 201 behind that are no longer defined. Some image editing applications leave white pixels or transparent pixels (holes) behind, others leave the original pixels behind. In any case, unwanted artifacts can occur. For instance, if the selected bitmap area 202 enclosed a ball, the bitmap area 201 may now show half a ball after the moving of the bitmap portion (in those instances in which original pixels are let behind) or a "hole" (in those instances in which original pixels are replaced with some default value).

However, if the bitmap area 201 is defined as area D and algorithm 01 is applied, said bitmap area 202 can be moved around in the image, leaving no artifacts or holes in bitmap area 201. Using this method, an image element can be moved within an image by receiving the boundary of a source region comprising the image element, receiving a destination region within the image, copying image data from the source region to the destination region, determining a residual region, comprising area of the source region that does not intersect with the destination region, and applying an inpainting routine to the residual region.

Finding Area D—Method 4: Undefined Areas Due to Image Distortion

When images are distorted (rotated, corrected for perspective, or corrected for lens defects such as barrel or pincushion distortion) they typically no longer have a shape that matches a straight rectangle that is parallel to the x and y axes. Therefore significant parts of the distorted image need to be cut away to obtain a rectangular image again, or undefined (white) pixels need to be included in the result. FIG. 1C show such a result. Rotated image 300 shows the result of a rotation. Distorted image 400 shows the result of a more complex distortion, for instance a lens correction with a connected perspective correction. The small enclosed areas along the border show the areas that would no longer be defined.

Now, if all pixels along the margin of the resulting image 300 or image 400 are filled up with the closest pixel that carries actual values, said undefined areas are surrounded by a margin of now defined pixels. If successively those areas (typically 4 areas) are defined as area D and fed into Algorithm 01, and the four results are combined to one image, a distorted image of acceptable size without missing or undefined pixels can be obtained. How to combine the four results into one image is evident to those skilled in the art; during the merging defined pixels need to overwrite the undefined pixels.

FIG. 4 show such a progress. FIG. 4A shows a rotated image with four "empty" corners. FIG. 4B shows how margin pixels were filled in on the upper left corner to form a closed area C. FIG. 4C shows how that destination area C was split up (see below) into two closed areas D1 and D2, using a linear interpolation of pixel values along the cutting path/cutting vector. FIG. 4D shows the final inpainted result for the upper left corner.

Finding Area S

Algorithm 01 contains a step that requests finding an area S that contains a structure suitable to be inserted at the location of the area D. ("S" stands for source and "D" for destination of the copy process.) Imagine that D contains some foliage on the ground, or patterned tiles on a wall, or fine twigs against a sky. In that case that the fine details along the margin of S and D should be as similar as possible. This Algorithm 03, which parses the details of the margin at a fine resolution, optimally on a pixel level, may be used to find S:

Algorithm 03

1—detect the pixels at δD, being the margin of D.

2—make a guess for a candidate for S and detect its margin pixels, being δS.

3—since δD and δS are vectors of many RGB vectors, measure the quality of match by the Euclidean distance between the vectors δD and δS.

4—unless a high number (about 10,000) of candidates were tested, go to 2

5—define S as the candidate with the best measured quality.

This algorithm leads to surprisingly good results, since a very detailed comparison of the margin is performed. If higher speed is desired (the algorithm isn't slow, though), a rougher scale can also be used, but we recommend not to downscale the image by more than a factor of 5.

Other distance measures could be tried. For example, the algorithm can be enhanced by combining the measure for the quality of a candidate for S by measuring both the Euclidean vector distance and the angle between the vectors, which makes the measure for the quality less dependent on absolute brightness. Note that angle here refers to the angle between two vectors in a space of several hundred dimensions, depending on the border length of δD and δS.

Also, the algorithm can be enhanced by applying Algorithm 03 on a highpass version of the image, ensuring that absolute colors and soft color gradients are disregarded in the measuring of the quality. Step 4 of Algorithm 01 will correct for absolute color differences and low frequency mismatches. A further enhancement is to apply the algorithm of a weighted mix of the original image and its highpass.

The algorithm can be even more enhanced by not applying it on RGB values but on either Lab values (id est 3 channels), or even more channels such as luminance, entropy, median of luminance, high pass of luminance, high pass of chroma a, or high pass of chroma b. This ensures even more that replacement areas are found that have not only small vector difference in details along the margin, but also a comparable structure, to avoid, for instance, foliage being replaced with tapestry, or grass being replaced with clouds.

Note that step 2 of Algorithm 03, "make a guess for a candidate for S", refers to defining an area of the same size as D within the same image or a different image. This can be done by using a random position, or by successively moving it along a virtual and more or less coarse raster. If different images are taken into consideration, the algorithm may focus on comparable images on the hard drive with similar EXIF data, for instance images with comparable ISO setting. Alternatively, consider that the user has used a "remove skin blemish" tool or a "remove object from wall" tool, etc., then S can also be searched in a database of images containing such structure.

Enhancement to Finding S

FIG. 1D shows the shape of a source margin 500, which is $\delta S$. Note that the shape of the source margin 500 and the destination margin $\delta D$ (not shown) are at this time identical. The curve $\delta S$ is partitioned into intervals 501, 502, 503, and 504. If $\delta S$ is provided by a parameterization by its arc length s (which is a convenient representation in the discrete pixel world), for instance so that the trace of $\delta S$ is given by $\delta S$: $[0 \ldots s] \to R^2$, then the four intervals can be defined as

501: [0, s/4]
502: [s/4, s/2)
503: [s/2, 3s/4)
504: [3s/4, s]

having the center points s/8, 3s/8, 5s/8, and 7s/8 respectively. Note that it is irrelevant where the starting point of the parameterization is defined, but it might be slightly beneficial to position one of the center points so that it coincides with a stark contrast change on $\delta D$ (again, keep in mind that $\delta S$ and $\delta D$ have the same shape, so considerations on their parameterizations are interchangeable).

Remember that Algorithm 03 describes that S can be found by overlaying successively the margin $\delta S$ over the image, measuring the quality of match and defining S as the candidate that was found to have the best match.

The algorithm can be enhanced by—whenever a good match is encountered—additionally moving the four sections of the margin candidate intervals 501, 502, 503, and 504 around by a small maximum spatial distance, so that it is detected whether a slight offset may increase the match on one or more of the four sides. As shown in FIG. 1E, the temporary torn-apart source margin 600 is now called $\delta S^*$, with intervals 501, 502, 503, and 504 now moved and represented by intervals 601, 602, 603, and 604. What is actually overlaid over the image and tested for a quality of match may look like what is shown in FIG. 1E.

If this leads to a better match, then the four center points at $\delta S^*(s/8)$, $\delta S^*(3s/8)$, $\delta S^*(5p/8)$, $\delta S^*(7p/8)$ (of the torn-apart source margin 600) are stored as variables, the image area around the found candidate is also stored in a separate memory block which is then distorted to match better. The easiest approach is to distort it so that the centers of the shifted curve segments of $\delta S^*$ match the centers of the four components of the undistorted curve $\delta S$. Note that a distortion based upon four reference points is clearly defined, for instance known as perspective distortion. We are distorting the entire found area (interior and its margin) to better match the destination area.

The in such way distorted bitmap and the trace of $\delta S$ (not $\delta S^*$) within this bitmap is then the found candidate for S. Out of such candidates, find the optimal one and define it as S. FIG. 2 shows the advantages of such a method: If the margins of a replacement piece don't fit optimally (FIG. 2A, arrows), a slight distortion (FIG. 2B, arrows) can enhance the result.

Bitmap Adaption

The last step of Algorithm 01 is to adjust the brightness of the copied pixels. Imagine that this algorithm—when step 4 is reached—has copied a more or less suitable bitmap from S into D. If this is for instance a piece of tapestry in a shadow that was copied into a bright piece of tapestry, then by the end of step 3 there will be a dark area within the image. This is a rather easy problem, since the pixels are more or less uniformly too dark, but it may get more complicated: If foliage is copied from here to there, the luminosity difference may be much more complicated due to the complex structure.

Bitmap Adaption—3×3 Kernel Adaption

This adaption method is based on the margin differences. Once the pixels have been copied from S into D, the margin difference $\delta M = \delta D - \delta S$ is calculated ($\delta D$ and $\delta S$ referring to the original pixels at the margin of the two areas S and D in the original image. The subtraction refers to a pairwise subtraction of pixel values, not an exclusion operator). The difference $\delta M$ is then a number of border pixels having positive and negative values. We suggest to create a (signed) pixel block M in memory, and to write the values of $\delta M$ into this pixel block and then to fill the values in M based upon the border values in $\delta M$.

As suggested by Oliveira et al, proceedings of VIIP 2001, "Fast Digital Inpainting", M can be gained from $\delta M$ by iteratively applying a kernel such as the following to the pixels enclosed by $\delta M$, and not modifying the border pixels themselves:

[0.073235, 0.176765, 0.073235
0.176754, 0.0, 0.176765
0.073235, 0.176765, 0.073235]

This method of adaption can also be used if a user manually copies an image element from one location to another, such as in FIG. 1B, where the element 202 may not fit seamlessly into its new location.

Bitmap Adaption—Illumination Adaption

Another approach is to determine the illumination function in the area D and in the area S (before pixels were copied), named ill(D) and ill(S), and—after the copying has taken place—to adjust the illumination of the copied pixels by multiplying them by the factor ill(D)/ill(S). Those skilled in the art will know that pixels can be represented by the product of a surface color and its illumination. Based on this theory, the above mentioned multiplication will bring the copied pixels into the correct light, making them match better.

In all suggested adaption methods, it may facilitate the implementation if the data is first copied from S to S', S' being a region in a separate bitmap in memory, then $\delta M$ and M are calculated, then the contents of S' is adapted using M, and then the contents of S' is copied into the area D.

Making source pixels fit seamlessly into a destination area by adding a correction matrix M onto it can also be used if a user wants to copy data within an image or across an image. For instance, when bitmap data are moved as shown in FIG. 1B, the bitmap data can be adapted to fit to the new location by defining $\delta M = \delta D - \delta S$, S being the copy source area and D being the copy destination area, and filling in M using one of the above named adaptions. The advantage of using, for instance, a kernel to iteratively fill M based upon $\delta M$ is that the algorithm works even if $\delta M$ is not continuous. This allows for bitmap adaption even if part of $\delta M$ is not defined, which may occur when a bitmap is copied on an image area that is only partly defined—see the bitmap area 201 for such an undefined area.

Slicing D

The idea slicing D for better results is the idea to "divide and conquer". Concretely, this can look as follows:

Algorithm 04

1—receive large area C
2—divide C into $D_1, D_2 \ldots D_N$, where $D_1 \ldots D_N$ are disjoint and $D_1 \cup D_1 \ldots \cup D_{N=C}$
3—apply algorithm 01 on $D_1, D_2 \ldots D_N$ Obviously, the difference is now that the replacement area is a little "patchwork" of multiple bitmaps. The advantage is that Algorithm 01 is more likely to find well-fitting replacement areas when the received area to be inpainted is not too large, and also that the inpainted area C will not contain a large structure identical to a different area in the image, which would be confusing to the viewer.

FIG. 5A shows such a large area C. Note that area C is extended (i.e., it is long and narrow), which may be very often the case. This makes the slicing approach even more successful. The routine for slicing C into $D_1 \ldots D_N$, as shown in FIG. 5B, can look as follows:

Algorithm 05

1—receive large area C.
2—find many (10,000) cutting vectors that start at random point of δC and end at a different random point of δC.
3—out of these, sort all out those cross pixels not belonging to C.
4—out of the remaining, sort all out that are too short (<1% of arc length of δC).
5—within the remaining, find the ones where the conditions A1, A2 and A3 (as defined below) are low.

Algorithm 05 is suitable to divide an area C into two sub-areas by identifying a cutting vector. To those skilled in the art of computer science and recursive programming it will be obvious that this can be used to further cut C into more sub-areas until sufficient sub-areas $D_1 \ldots D_N$ are found, as in FIG. 5B. How many areas N are to be found depends on the desired effect and the size of C. A good start for a sub-area amount may be N=int(arc length of δC/250). The conditions A1, A2 and A3 of line 5 of algorithm 05 can be the following:

Condition A1:

If a and b, as shown in FIG. 5C, are the start and end points of a cutting vector, that is to say a and b lie at the intersection points of the cutting vector and δC itself, then condition A1 is the ratio of the arc length of δC from point a to b (take the shortest of the two paths from a to b along δC) to the vector length. For example, if A1 is high, the vector is short and cuts a decent part off of C. However, if A1 is low (close to 1), the area enclosed between the vector and δC cannot be large, which makes the cutting vector not a good candidate.

Condition A2:

The second condition is any means to compare the similarity of pixels within δC around the point a and the point b. For instance, the ten pixels closest to a and the ten pixels closest to b can be compared with regard to the color difference, the chrominance difference, etc. Condition A2 helps finding cutting vectors the ends of which (a and b) lie within similar structure. This should avoid that one end of the vector lies on a foliage structure and the other end lies on a sky structure, leading to a suboptimal cutting vector. A2 can be a number, where 0 represents good similarity (sky-sky) and 10 represents poor similarity (sky-foliage). Multiple methods are known to the skilled in the art for detection of a difference between two sets/vectors of colors.

Condition A3:

The third condition A3 can be a low number if both a and b are remote from an edge within δC, and high if a or b is close to an edge in δC. This should ensure that the cutting vector does not cut C in the vicinity of an object edge, where artifacting would be most visible.

If all conditions A1, A2, A3 are low, the current candidate is a good candidate for a cutting vector Side-Note: In some cases it may occur that the area C is not continuous to begin with, for instance in cases as depicted in FIG. 1B, if bitmap area 202 was moved only by a short distance and intersects bitmap area 201. If C is not continuous, δC will consist of several closed paths. It is suggested that each of the sub-components of C enclosed by a closed path can be considered a "slice" $D_n$ of C. In other words: If C is divided to begin with, one should use this dividedness as a starting for the "divide and conquer" approach.

Once area C is cut into N sub-areas $D_1 \ldots D_N$, it is easy to use algorithm 04 to replace the data within C with new data. Note that along the cutting vectors, no pixel values may exist, therefore we suggest that the pixel values along the cutting vectors be interpolated between the start and the end point of the cut. This is trivial since this is a one-dimensional interpolation. This needs to be done to ensure that all $D_n$ have borders with defined pixels.

We suggest that one actually copies a little more data for every $D_n$ (for instance by expanding the areas $D_1 \ldots D_N$ by a few pixels) and then blending them into one another with a soft transition (by using a Gaussian kernel on the copy mask) or by using the technique of "minimum error boundary" (as suggested by D. S. Wickramanayake and H. E. Bez and E. A. Edirisindhe, "*Multi Resolution Texture Synthesis in Wavelet Transform Domain*.").

Note that any technique of "minimum error boundary" will replace the straight vectors by more or less curved paths. Also, in a simpler approach, one may want to convert the straight path into a curved path, such as a sine curve, being less detectable to the eye of viewer.

The above described method has shown to produce superior results when large areas in an image containing structure need to be inpainted.

All features disclosed in the specification, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

This invention is not limited to particular hardware described herein, and any hardware presently existing or developed in the future that permits processing of digital images using the method disclosed can be used, including for example, a digital camera system.

A computer readable medium is provided having contents for causing a computer-based information handling system to perform the steps described herein.

The term memory block refers to any possible computer-related image storage structure known to those skilled in the art, including but not limited to RAM, processor cache, hard drive, or combinations of those, including dynamic memory structures. Preferably, the methods and application program interface disclosed will be embodied in a computer program (not shown) either by coding in a high level language.

Any currently existing or future developed computer readable medium suitable for storing data can be used to store the programs embodying the afore-described interface, methods and algorithms, including, but not limited to hard drives, floppy disks, digital tape, flash cards, compact discs, and DVD'S. The computer readable medium can comprise more than one device, such as two linked hard drives. This invention is not limited to the particular hardware used herein, and any hardware presently existing or developed in the future that permits image processing can be used.

Any currently existing or future developed computer readable medium suitable for storing data can be used, including, but not limited to hard drives, floppy disks, digital tape, flash cards, compact discs, and DVD'S. The computer readable medium can comprise more than one device, such as two linked hard drives, in communication with the processor.

The invention claimed is:

1. A method comprising:
    dividing the destination region having image data into sub-pieces along one or more cutting paths, wherein the cutting paths start and end at two different points on the border of the destination region;
    finding replacement data for the sub-pieces found elsewhere in the image; and
    adapting the replacement data to fit in the destination region, wherein the adapting comprises adjusting an illumination of pixels, and wherein the adjusting comprises multiplying an illumination of the replacement data from a source region by a predetermined factor that is based on the illumination function, wherein the illumination function is based on an illumination of the destination region and an illumination of the source region, and wherein the source region contains the replacement data.

2. The method of claim 1, wherein the cutting paths are determined as a function of the type of image structured at the start and the end point of the cutting path.

3. The method of claim 1, wherein the cutting paths are determined as a function of the area of the sub-pieces and the lengths of the cutting paths.

4. The method of claim 1, wherein the destination region is the product of a rotation, a perspective correction, a lens distortion correction, or a creative image distortion.

5. The method of claim 1, wherein the illumination function is based on ill(D)/ill(S), wherein ill(D) is an illumination of the destination region, and wherein ill(S) is an illumination of the source region.

6. The method of claim 5, wherein the adapting of the replacement data comprises:
    copying the replacement data from the source region to a separate region in a separate bitmap in memory;
    applying a correction matrix to adapt the replacement data in the separate region; and
    copying the replacement data from the separate region to the destination region.

7. The method of claim 5, wherein the destination region is determined by a spot detection algorithm, wherein the spot detection algorithm detects areas of luminosity and border-pixel-to-total-pixel ratios, and wherein the spot detection algorithm detects a border-pixel-to-total-pixel ratio below a predetermined ratio.

8. A non-transitory computer readable medium is provided having contents for causing a computer-based information handling system to perform the method of claim 1.

* * * * *